US012638942B2

(12) United States Patent
Hong

(10) Patent No.: US 12,638,942 B2
(45) Date of Patent: May 26, 2026

(54) CHARGE PUMP, TOUCH DRIVER INCLUDING THE SAME AND DISPLAY APPARATUS INCLUDING THE SAME

(71) Applicant: SAMSUNG DISPLAY CO., LTD., Yongin-si (KR)

(72) Inventor: Jin-Taek Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/978,707

(22) Filed: Dec. 12, 2024

(65) Prior Publication Data

US 2025/0216985 A1    Jul. 3, 2025

(30) Foreign Application Priority Data

Dec. 27, 2023    (KR) ........................ 10-2023-0192719

(51) Int. Cl.
*G06F 3/041*        (2006.01)
*H02M 1/44*        (2007.01)
*H02M 3/07*        (2006.01)
*G06F 3/044*        (2006.01)

(52) U.S. Cl.
CPC ........ G06F 3/04184 (2019.05); G06F 3/0412 (2013.01); H02M 1/44 (2013.01); H02M 3/07 (2013.01); *G06F 3/04166* (2019.05)

(58) Field of Classification Search
CPC ............... G06F 3/0412; G06F 3/04166; G06F 3/04184; H02M 1/44; H02M 3/07

USPC ................................................. 345/174, 173
See application file for complete search history.

(56) References Cited

U.S. PATENT DOCUMENTS 8,363,856 B2 *    1/2013    Lesso ...................... H03F 3/187
                                                            381/122
2025/0169342 A1 *    5/2025    Jang ........................ H10K 59/95

FOREIGN PATENT DOCUMENTS

KR          10-1305850          9/2013
KR     10-2018-0094206          8/2018
KR     10-2022-0039465          3/2022

* cited by examiner

*Primary Examiner* — Julie Anne Watko
(74) *Attorney, Agent, or Firm* — F. CHAU & ASSOCIATES, LLC

(57)                ABSTRACT

A charge pump includes a first switch including a first electrode receiving a first voltage and a second electrode connected to a first node, a second switch including a first electrode connected to a second node and a second electrode connected to a ground, a third switch including a first electrode connected to the first node and a second electrode connected to the ground, a fourth switch including a first electrode connected to the second node and a second electrode connected to a third node, a first capacitor connected to the first node and connected to the second node, a second capacitor connected to the third node and connected to the ground, a first converting switch receiving a power voltage and connected to the first node and a second converting switch receiving the power voltage and connected to the second node.

20 Claims, 13 Drawing Sheets

FIG. 4

VS1     REGULATION FAIL

TXS

0V

VS1

TXS

0V

F I G. 20
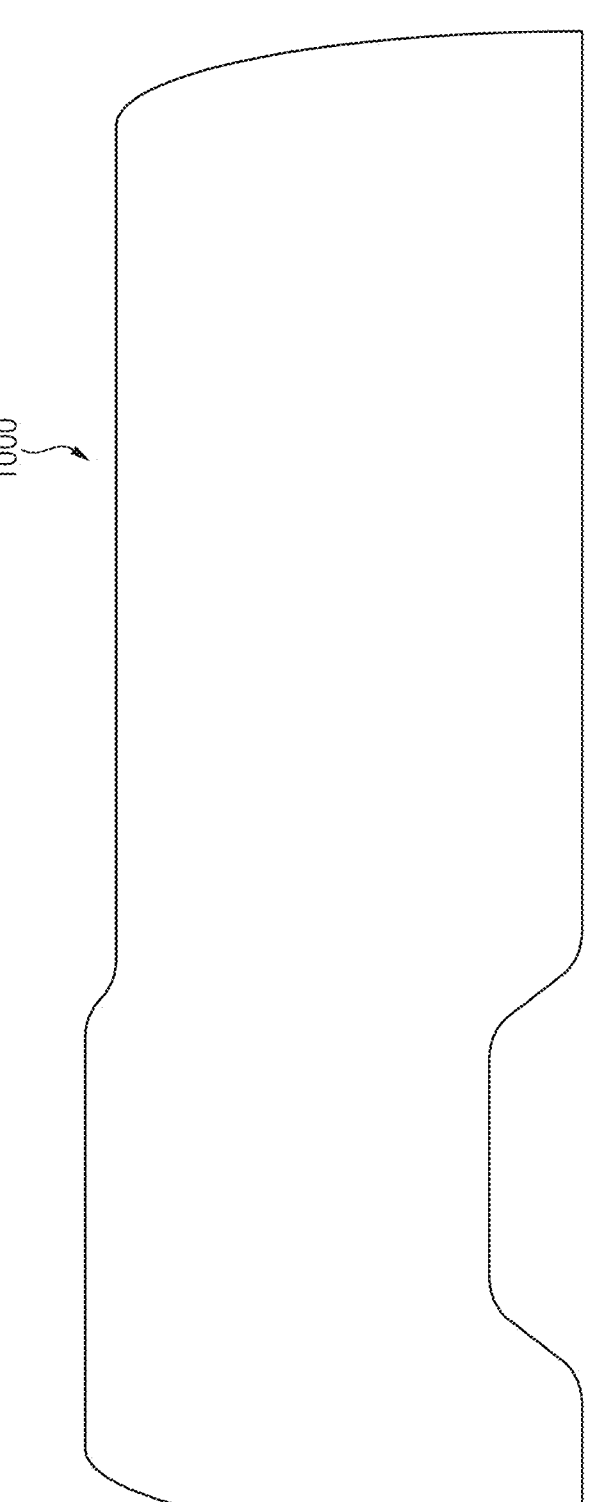
1000

1

CHARGE PUMP, TOUCH DRIVER INCLUDING THE SAME AND DISPLAY APPARATUS INCLUDING THE SAME

CROSS-REFERENCE TO RELATED APPLICATION(S)

This patent application claims priority under 35 U.S.C. § 119 to Korean Patent Application No. 10-2023-0192719, filed on Dec. 27, 2023 in the Korean Intellectual Property Office KIPO, the disclosure of which is incorporated by reference in its entirety herein.

TECHNICAL FIELD

Embodiments of the present inventive concept are directed to a charge pump, a touch driver including the charge pump and a display apparatus including the touch driver. More particularly, embodiments of the present inventive concept are directed to a charge pump capable of handling a heavy load, reducing a power consumption and reducing electromagnetic interference (EMI).

DISCUSSION OF RELATED ART

When an electronic apparatus is mounted in an automobile, the standards for EMI radiation are much stricter for certain frequency ranges, specifically the long wave and middle wave frequency ranges. The automobile may include a display panel and a touch panel. However, when EMI radiation generated from the touch panel and EMI radiation generated from the display panel are combined, it may be more difficult to meet these standards internationally.

Radiation noises in the long wave frequency range and the middle wave frequency range are mainly caused by a touch driving voltage of the touch panel. While an EMI shield film could be used to reduce EMI radiation, its presence may prevent a touch operation of the touch panel from operating normally. Thus, methods to reduce EMI due to a touch operation are needed.

SUMMARY

Embodiments of the present inventive concept provide a charge pump capable of handling a heavy load, reducing a power consumption and reducing an electromagnetic interference (EMI).

Embodiments of the present inventive concept also provide a touch driver including the charge pump.

Embodiments of the present inventive concept also provide a display apparatus including the touch driver.

In an embodiment according to the present inventive concept, a charge pump includes a first switch, a second switch, a third switch, a fourth switch, a first capacitor, a second capacitor, a first converting switch and a second converting switch. The first switch includes a first electrode configured to receive a first voltage and a second electrode connected to a first node. The second switch includes a first electrode connected to a second node and a second electrode connected to a ground. The third switch includes a first electrode connected to the first node and a second electrode connected to the ground. The fourth switch includes a first electrode connected to the second node and a second electrode connected to a third node. The first capacitor includes a first electrode connected to the first node and a second electrode connected to the second node. The second capacitor includes a first electrode connected to the third node and a second electrode connected to the ground. The first converting switch includes a first electrode configured to receive a power voltage and a second electrode connected to the first node. The second converting switch includes a first electrode configured to receive the power voltage and a second electrode connected to the second node.

In an embodiment, in a first operation, the first switch and the second switch may be turned on and the third switch, the fourth switch, the first converting switch and the second converting switch may be turned off.

In an embodiment, in a second operation, the third switch and the fourth switch may be turned on and the first switch, the second switch, the first converting switch and the second converting switch may be turned off.

In an embodiment, in a third operation, the second converting switch and the third switch may be turned on and the first switch, the second switch, the fourth switch and the first converting switch may be turned off.

In an embodiment, in a fourth operation, the first converting switch and the fourth switch may be turned on and the first switch, the second switch, the third switch and the second converting switch may be turned off.

In an embodiment according to the present inventive concept, a touch driver includes a first charge pump, a second charge pump, a path switch and a signal generator. The first charge pump is configured to receive a power voltage to output a first voltage. The first charge pump is configured to receive a power voltage to output a first voltage. The path switch includes a first electrode connected to an output terminal of the first charge pump and a second electrode connected to an output terminal of the second charge pump. The signal generator includes a first input terminal connected to the output terminal of the first charge pump and a second input terminal connected to the output terminal of the second charge pump.

In an embodiment, in a first mode, the path switch may be turned off, the first voltage may be applied to the first input terminal of the signal generator and the second voltage may be applied to the second input terminal of the signal generator.

In an embodiment, in a second mode, the path switch may be turned on, the first voltage may be applied to the first input terminal of the signal generator and the second voltage may be applied to the first input terminal of the signal generator.

In an embodiment, the second charge pump may include a first switch including a first electrode configured to receive the first voltage and a second electrode connected to a first node, a second switch including a first electrode connected to a second node and a second electrode connected to a ground, a third switch including a first electrode connected to the first node and a second electrode connected to the ground, a fourth switch including a first electrode connected to the second node and a second electrode connected to a third node, a first capacitor including a first electrode connected to the first node and a second electrode connected to the second node, a second capacitor including a first electrode connected to the third node and a second electrode connected to the ground, a first converting switch including a first electrode configured to receive the power voltage and a second electrode connected to the first node and a second converting switch including a first electrode configured to receive the power voltage and a second electrode connected to the second node.

In an embodiment, in a first operation, the first switch and the second switch may be turned on, the third switch, the fourth switch, the first converting switch and the second converting switch may be turned off and the path switch may be turned off.

In an embodiment, in a second operation, the third switch and the fourth switch may be turned on, the first switch, the second switch, the first converting switch and the second converting switch may be turned off and the path switch may be turned off.

In an embodiment, in a third operation, the second converting switch and the third switch may be turned on, the first switch, the second switch, the fourth switch and the first converting switch may be turned off and the path switch may be turned off.

In an embodiment, in a fourth operation, the first converting switch and the fourth switch may be turned on, the first switch, the second switch, the third switch and the second converting switch may be turned off and the path switch may be turned on.

In an embodiment, the first charge pump may include a first switch including a first electrode configured to receive the power voltage and a second electrode connected to a second node, a second switch including a first electrode connected to a first node and a second electrode connected to a ground, a third switch including a first electrode configured to receive the power voltage and a second electrode connected to the first node, a fourth switch including a first electrode connected to the second node and a second electrode connected to a third node, a first capacitor including a first electrode connected to the first node and a second electrode connected to the second node and a second capacitor including a first electrode connected to the third node and a second electrode connected to the ground.

In an embodiment, in a first operation of the first charge pump, the first switch and the second switch of the first charge pump may be turned on and the third switch and the fourth switch of the first charge pump may be turned off.

In an embodiment, in a second operation of the first charge pump, the third switch and the fourth switch of the first charge pump may be turned on and the first switch and the second switch of the first charge pump may be turned off.

In an embodiment, the touch driver may further include a multiplexer connected to the signal generator. The multiplexer may be connected to a transmitting electrode of a touch panel.

In an embodiment of a display apparatus according to the present inventive concept, the display apparatus includes a display panel, a display panel driver, a touch panel and a touch driver. The display panel driver is configured to drive the display panel. The touch driver is configured to drive the touch panel. The touch driver includes a first charge pump configured to receive a power voltage and to output a first voltage, a second charge pump configured to receive the power voltage and the first voltage and output a second voltage, a path switch including a first electrode connected to an output terminal of the first charge pump and a second electrode connected to an output terminal of the second charge pump and a signal generator including a first input terminal connected to the output terminal of the first charge pump and a second input terminal connected to the output terminal of the second charge pump.

In an embodiment, the second charge pump includes a first switch including a first electrode configured to receive the first voltage and a second electrode connected to a first node, a second switch including a first electrode connected to a second node and a second electrode connected to a ground, a third switch including a first electrode connected to the first node and a second electrode connected to the ground, a fourth switch including a first electrode connected to the second node and a second electrode connected to a third node, a first capacitor including a first electrode connected to the first node and a second electrode connected to the second node, a second capacitor including a first electrode connected to the third node and a second electrode connected to the ground, a first converting switch including a first electrode configured to receive the power voltage and a second electrode connected to the first node and a second converting switch including a first electrode configured to receive the power voltage and a second electrode connected to the second node.

In an embodiment, the first charge pump may include a first switch including a first electrode configured to receive the power voltage and a second electrode connected to a second node, a second switch including a first electrode connected to a first node and a second electrode connected to the ground, a third switch including a first electrode configured to receive the power voltage and a second electrode connected to the first node, a fourth switch including a first electrode connected to the second node and a second electrode connected to a third node, a first capacitor including a first electrode connected to the first node and a second electrode connected to the second node and a first capacitor including a first electrode connected to the third node and a second electrode connected to the ground.

According to an embodiment of the charge pump, the touch driver including the charge pump and the display apparatus including the touch driver, when the positive swing of a heavy load is needed, the second charge pump may be converted from the negative charge pump to the positive charge pump so that the charge pump may handle the heavy load. Accordingly, the reliability of the touch driver may be enhanced.

In addition, the second charge pump may be converted from the negative charge pump to the positive charge pump so that the distortion of the sine wave due to insufficient capacity of the first charge pump may be prevented and the deterioration of the EMI due to the distortion may be prevented. Thus, the EMI of the display apparatus may be reduced.

In addition, the second charge pump may be converted from the negative charge pump to the positive charge pump so that the current flowing through the first charge pump may be reduced and accordingly, the power consumption of the touch driver may be reduced.

BRIEF DESCRIPTION OF THE DRAWINGS

The above and other features of the present inventive concept will become more apparent by describing in detailed embodiments thereof with reference to the accompanying drawings, in which:

FIG. 4 is a circuit diagram illustrating a touch driver of FIG. 1;

FIG. 20 is a diagram illustrating an example in which the electronic apparatus of FIG. 18 is implemented as an automotive display.

DETAILED DESCRIPTION

Figure 1:
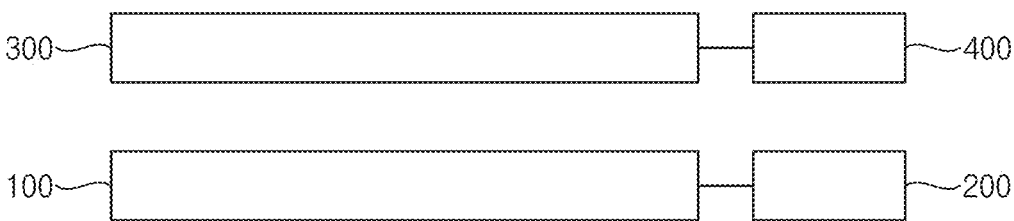
FIG. 1 is a block diagram illustrating a display apparatus according to an embodiment of the present inventive concept.

In the specification, the expression that a first component (or region, layer, part, portion, etc.) is "on", "connected with", or "coupled to" a second component means that the first component is directly on, connected with, or coupled to the second component or means that a third component is disposed therebetween. The same reference numeral refers to the same component. The expression "and/or" includes one or more combinations which associated components are capable of defining.

Hereinafter, the present inventive concept will be explained in detail with reference to the accompanying drawings.

Figure 2:
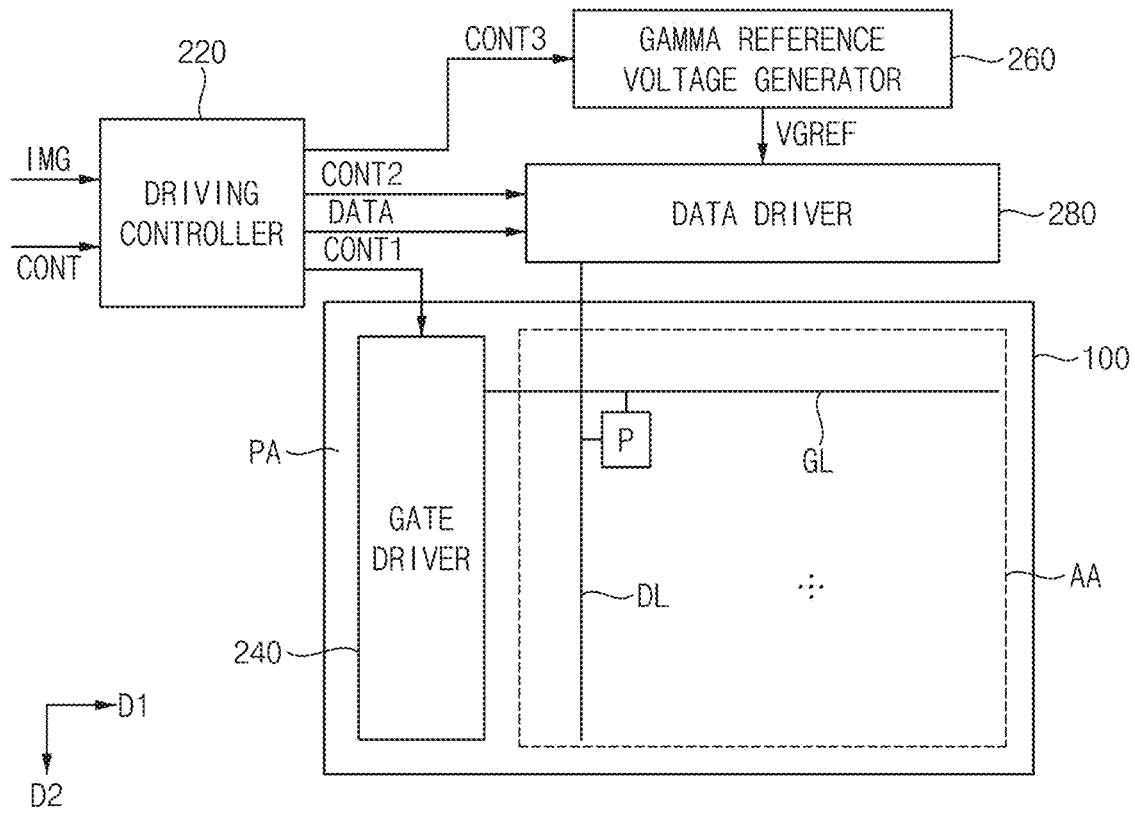
FIG. 2 is a block diagram illustrating a display panel and a display panel driver of FIG. 1.
Figure 3:
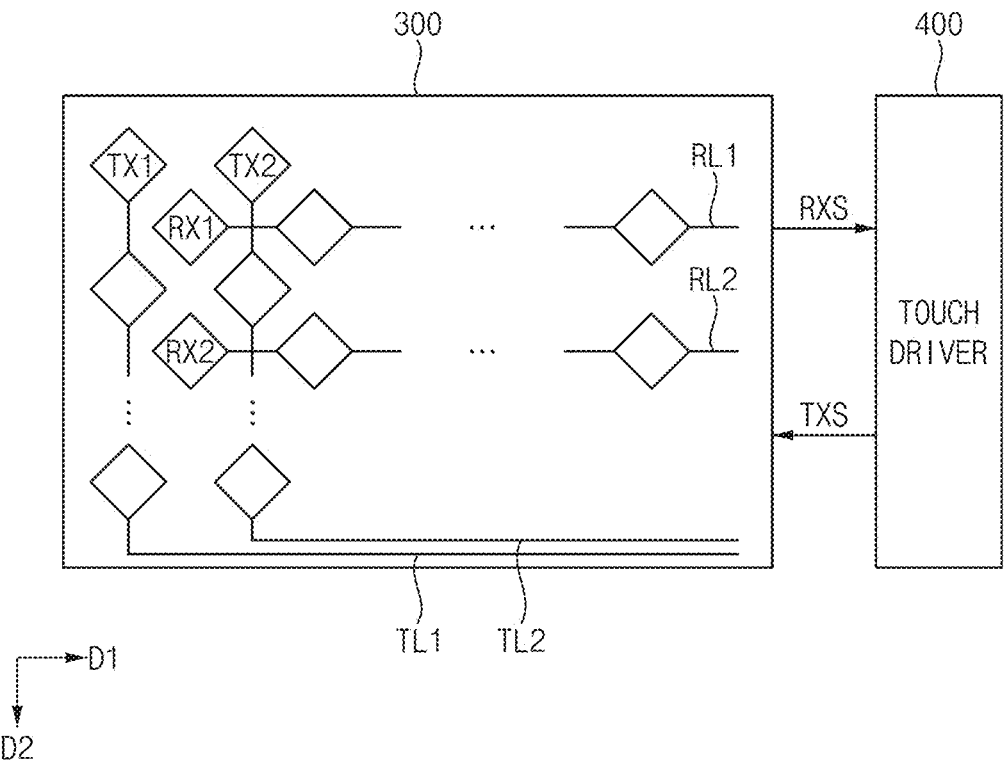
FIG. 3 is a block diagram illustrating a touch panel and a touch driver of FIG. 1.

FIG. 1 is a block diagram illustrating a display apparatus according to an embodiment of the present inventive concept. FIG. 2 is a block diagram illustrating a display panel 100 and a display panel driver 200 of FIG. 1. FIG. 3 is a block diagram illustrating a touch panel 300 and a touch driver 400 of FIG. 1.

Referring to FIGS. 1 to 3, the display apparatus includes a display panel 100, a display panel driver 200 (e.g., a first driver circuit), a touch panel 300 and a touch driver 400 (e.g., a second driver circuit).

The display panel 100 is configured to display an image. The display panel driver 200 drives the display panel 100.

The touch panel 300 is configured to sense a touch event. For example, the touch event may include a touch or approach of a finger or a stylus. The touch panel 300 may be disposed on the display panel 100. The touch driver 400 drives the touch panel 300.

In an embodiment, the display panel 100 and the touch panel 300 are integratedly formed. For example, the display panel 100 and the touch panel 300 may be combined into a single unit rather than being separate layers. In an embodiment, the display panel driver 200 and the touch driver 400 are integratedly formed. For example, the display panel driver 200 and the touch driver 400 may be combined into a single unit rather than being separate layers.

The display panel driver includes a driving controller 220 (e.g., a controller circuit), a gate driver 240, a gamma reference voltage generator 260 and a data driver 280 (e.g., a driver circuit).

For example, the driving controller 220 and the data driver 280 may be integratedly formed. For example, the driving controller 220 and the data driver 280 may be combined into a single unit. For example, the driving controller 220, the gamma reference voltage generator 260 and the data driver 280 may be integratedly formed. For example, the driving controller 220, the gamma reference voltage generator 260 and the data driver 280 may be combined into a single unit. A driving module including at least the driving controller 220 and the data driver 280 which are integratedly formed may be referred to a timing controller embedded data driver (TED).

The display panel 100 includes a display region AA on which an image is displayed and a peripheral region PA adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

The driving controller 220 receives input image data IMG and an input control signal CONT from an external apparatus (e.g., an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 220 generates a gate control signal CONT1, a data control signal CONT2, a gamma control signal CONT3 and a data signal DATA based on the input image data IMG and the input control signal CONT.

The driving controller 220 generates the gate control signal CONT1 for controlling an operation of the gate driver 240 based on the input control signal CONT, and outputs the gate control signal CONT1 to the gate driver 240. The gate control signal CONT1 may include a vertical start signal and a gate clock signal.

The driving controller 220 generates the data control signal CONT2 for controlling an operation of the data driver 280 based on the input control signal CONT, and outputs the data control signal CONT2 to the data driver 280. The data control signal CONT2 may include a horizontal start signal and a load signal.

The driving controller 220 generates the data signal DATA based on the input image data IMG. The driving controller 220 outputs the data signal DATA to the data driver 280.

The driving controller 220 generates the gamma control signal CONT3 for controlling an operation of the gamma reference voltage generator 260 based on the input control signal CONT, and outputs the gamma control signal CONT3 to the gamma reference voltage generator 260.

The gate driver 240 generates gate signals driving the gate lines GL in response to the gate control signal CONT1 received from the driving controller 220. The gate driver 240 outputs the gate signals to the gate lines GL. For example, the gate driver 240 may sequentially output the gate signals to the gate lines GL. For example, the gate driver 240 may be mounted on the peripheral region of the display panel 100. For example, the gate driver 240 may be integrated on the peripheral region of the display panel 100.

The gamma reference voltage generator 260 generates a gamma reference voltage VGREF in response to the gamma control signal CONT3 received from the driving controller 220. The gamma reference voltage generator 260 provides the gamma reference voltage VGREF to the data driver 280.

In an embodiment, the gamma reference voltage generator 260 may be disposed in the driving controller 220, or in the data driver 280.

The data driver 280 receives the data control signal CONT2 and the data signal DATA from the driving controller 220, and receives the gamma reference voltages VGREF from the gamma reference voltage generator 260. The data driver 280 converts the data signal DATA into data voltages having an analog type using the gamma reference voltages VGREF. The data driver 280 outputs the data voltages to the data lines DL.

As shown in FIG. 3, the touch panel 100 may include a plurality of transmitting electrodes TX1 and TX2 and a plurality of receiving electrodes RX1 and RX2.

For example, the transmitting electrodes TX1 and TX2 may include a plurality of electrode portions disposed in the second direction D2 and a plurality of connecting portions connecting the electrode portions. The transmitting electrodes TX1 and TX2 may be connected to transmitting lines TL1 and TL2, respectively. The transmitting line TL1 and TL2 may extend in the first direction D1.

For example, the receiving electrodes RX1 and RX2 may include a plurality of electrode portions disposed in the first direction D1 and a plurality of connecting portions connecting the electrode portions. The receiving electrodes RX1 and RX2 may be connected to receiving lines RL1 and RL2, respectively. The receiving lines RL1 and RL2 may extend in the first direction D1.

The touch driver 400 may apply a touch driving signal TXS to the touch panel 300. The touch driver 400 may receive a touch sensing signal RXS from the touch panel 300.

The touch driving signal TXS may be applied to the transmitting electrodes TX1 and TX2. For example, the touch driving signal TXS may be a sine wave signal.

Figure 4:
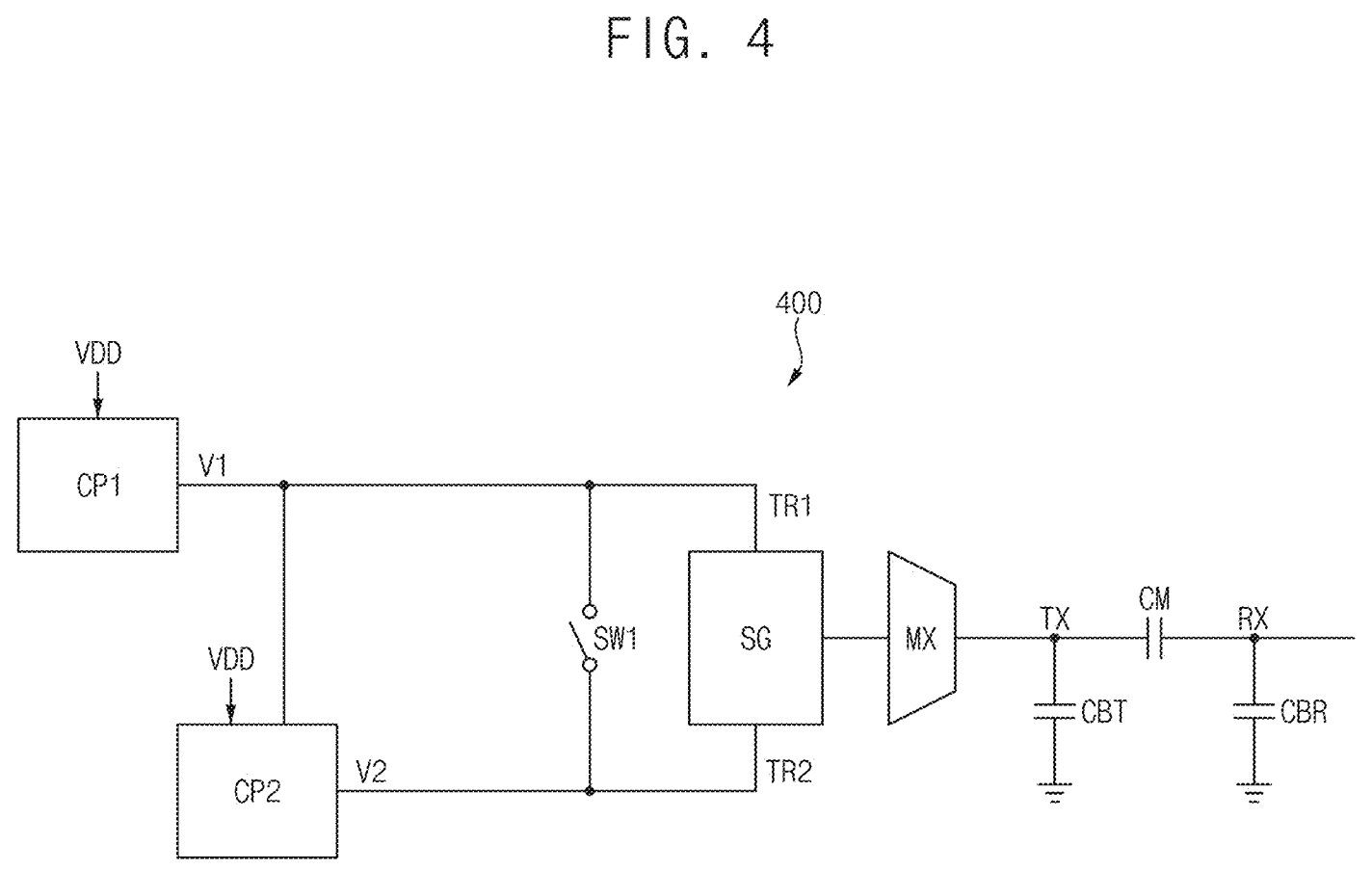
Figure 5:
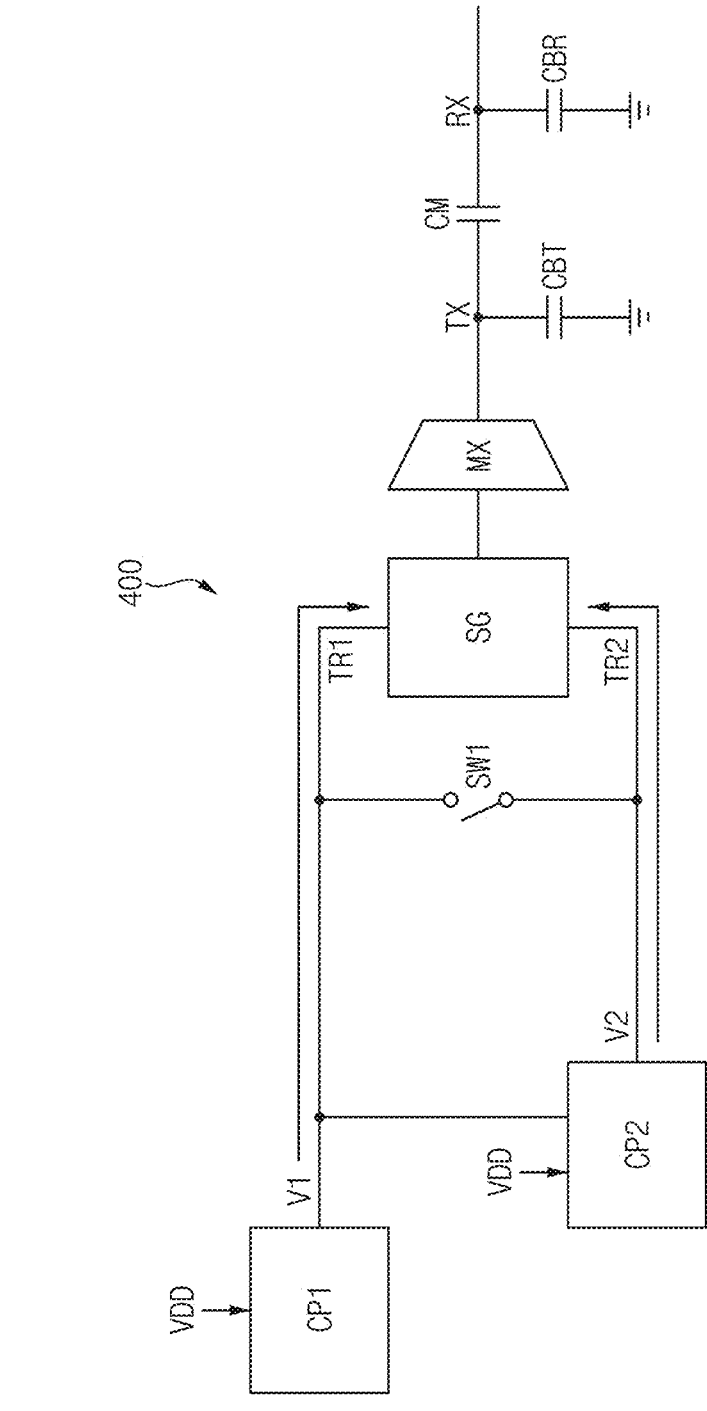
FIG. 5 is a circuit diagram illustrating an operation of the touch driver of FIG. 4 in a first mode.
Figure 6:
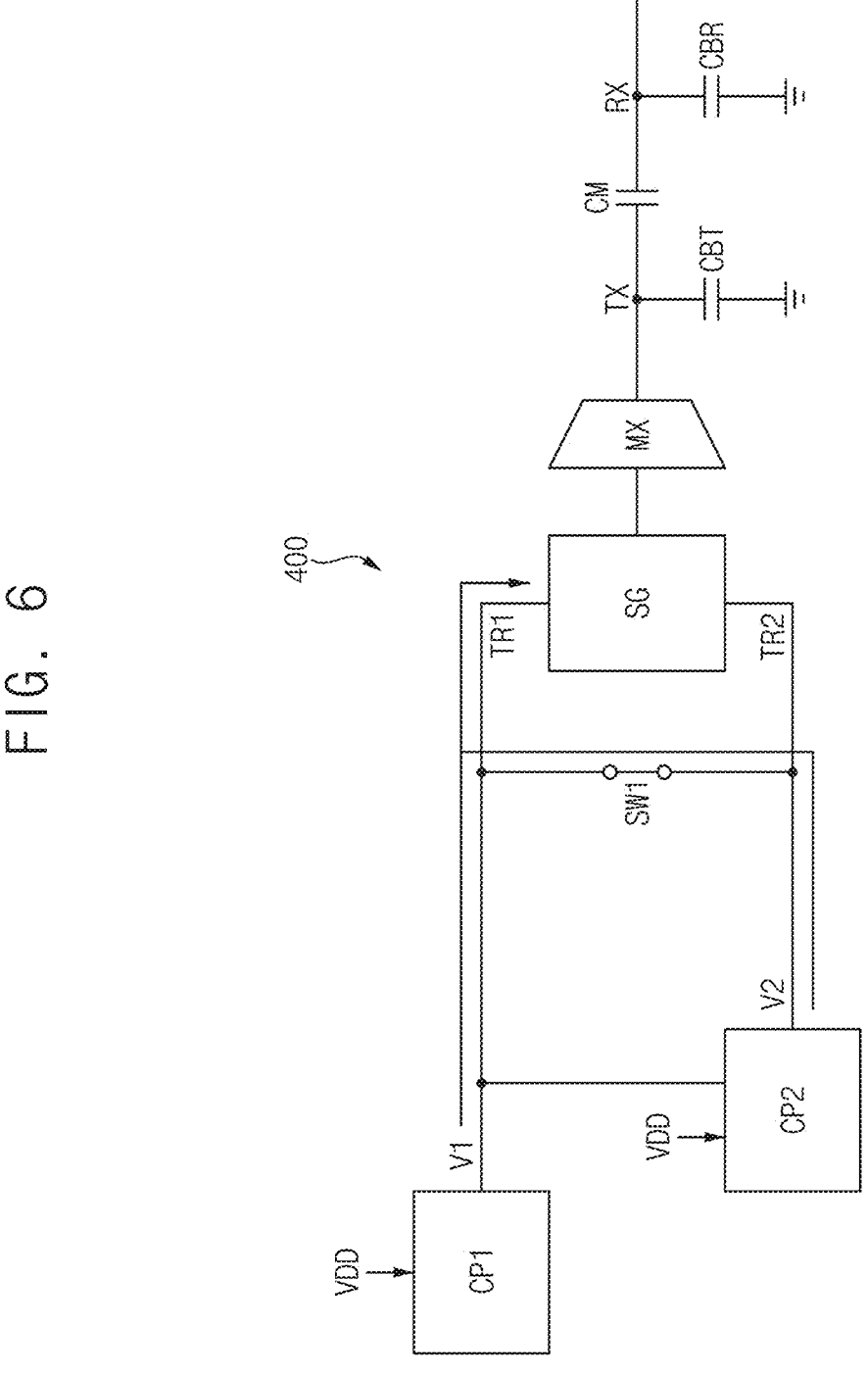
FIG. 6 is a circuit diagram illustrating an operation of the touch driver of FIG. 4 in a second mode.

FIG. 4 is a circuit diagram illustrating the touch driver 400 of FIG. 1. FIG. 5 is a circuit diagram illustrating an operation of the touch driver 400 of FIG. 4 in a first mode. FIG. 6 is a circuit diagram illustrating an operation of the touch driver 400 of FIG. 4 in a second mode.

Referring to FIGS. 1 to 6, the touch driver 400 includes a first charge pump CP1, a second charge pump CP2, a path switch SW1 and a signal generator SG.

The first charge pump CP1 receives a power voltage VDD and outputs a first voltage V1. For example, the first charge pump CP1 may be a positive charge pump. For example, the power voltage VDD may be x volts(V) and the first voltage V1 may be 2x volts(V). For example, the power voltage may be about 3V and the first voltage V1 may be about 6V.

The second charge pump CP2 receives the power voltage VDD and the first voltage V1 and outputs a second voltage V2. For example, the second charge pump CP2 may be a positive and negative switchable charge pump.

In the first mode, the second charge pump CP2 receives the first voltage V1 and outputs the second voltage V2. The first mode may be a positive-negative mode (or positive-to-negative mode). For example, in the first mode, the first voltage V1 may be 2x V and the second voltage V2 may be −2x V. For example, in the first mode, the first voltage V1 may be about 6V and the second voltage V2 may be about −6V.

In the second mode, the second charge pump CP2 receives the power voltage VDD and outputs the second voltage V2. The second mode is a positive only mode. For example, in the second mode, the power voltage VDD may be x V and the second voltage V2 may be 2x V. For example, in the second mode, the power voltage VDD may be about 3V and the second voltage V2 may be about 6V.

The path switch SW1 includes a first electrode connected to an output terminal of the first charge pump CP1 and a second electrode connected to an output terminal of the second charge pump CP2.

The signal generator SG includes a first input terminal TR1 connected to the output terminal of the first charge pump CP1 and a second input terminal TR2 connected to the output terminal of the second charge pump CP2. In an embodiment, the signal generator SG is a sine wave signal generator.

In the first mode, the path switch SW1 is turned off (or open), the first voltage V1 is applied to the first input terminal TR1 of the signal generator SG and the second voltage V2 is applied to the second input terminal TR2 of the signal generator SG. In the first mode, the signal generator SG generates the sine wave signal using the first voltage V1 having a positive value and the second voltage V2 having a negative value. When the first voltage V1 is 6V and the second voltage V2 is −6V, the signal generator SG may generate a sine wave signal increased and decreased between −6V and 6V. For example, the sine wave signal may oscillate with a maximum voltage of 6V and a minimum voltage of −6V, continuously varying between these two values in a periodic manner.

In the second mode, the path switch SW1 is turned on (or closed), the first voltage V1 is applied to the first input terminal TR1 of the signal generator SG and the second voltage V2 is applied to the first input terminal TR1 of the signal generator SG. In the second mode, the signal generator SG generates the sine wave signal using the first voltage V1 having a positive value and the second voltage V2 having a positive value. When the first voltage V1 is 6V and the second voltage V2 is 6V, the signal generator SG may generate a sine wave signal increased and decreased between 6V and 0V. For example, the sine wave signal may oscillate with a maximum voltage of 6V and a minimum voltage of 0V, continuously varying between these two values in a periodic manner.

The touch driver 400 may further include a multiplexer MX connected to the signal generator SG. The multiplexer MX may be connected to a transmitting electrode TX of the touch panel 300.

The touch panel 300 may further include a first touch capacitor CBT including a first electrode connected to the transmitting electrode TX and a second electrode connected to a ground, a second touch capacitor CBR including a first electrode connected to a receiving electrode RX of the touch panel 300 and a second electrode connected to the ground and a third touch capacitor CM including a first electrode connected to the transmitting electrode TX and a second electrode connected to the receiving electrode RX.

In an embodiment, the patch switch SW1 is implemented by a transistor, and a control circuit is present that outputs a control signal to a gate of the transistor that enables the transistor to be turned on or off as needed for the above-described modes.

Figure 7:
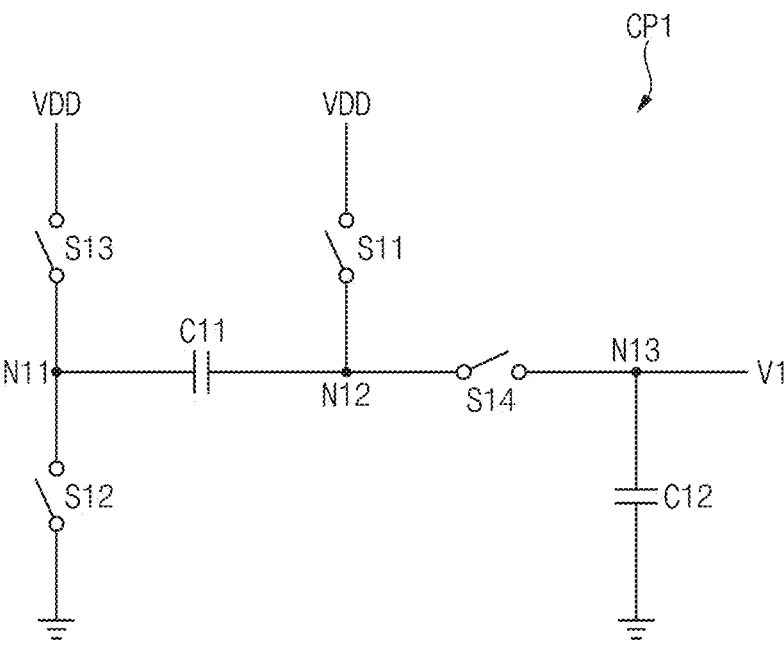
FIG. 7 is a circuit diagram illustrating a first charge pump of FIG. 4.
Figure 8:
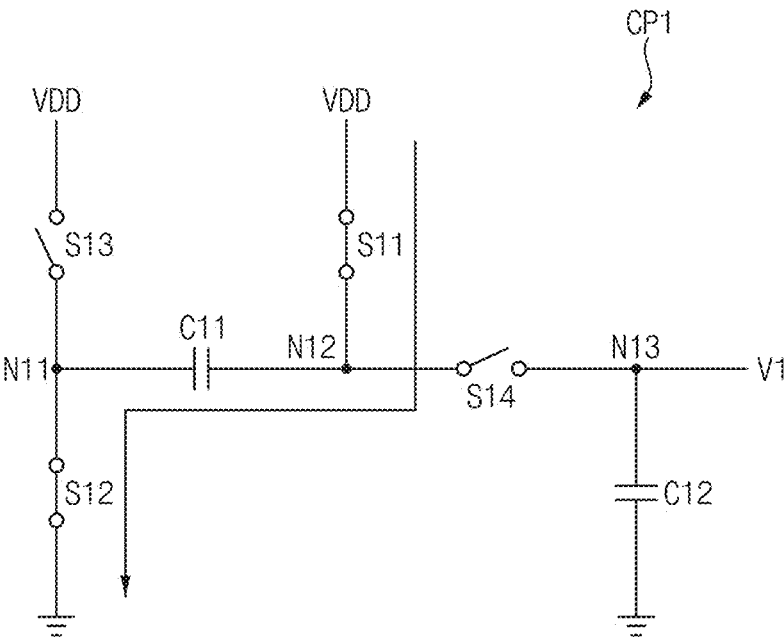
FIG. 8 is a circuit diagram illustrating an 1-1 operation of the first charge pump of FIG. 7.
Figure 9:
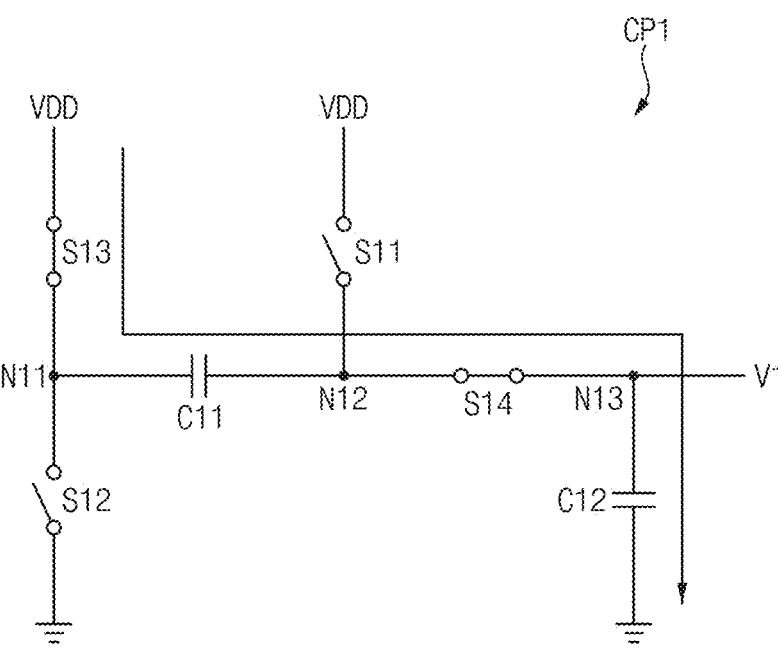
FIG. 9 is a circuit diagram illustrating an 1-2 operation of the first charge pump of FIG. 7.

FIG. 7 is a circuit diagram illustrating the first charge pump CP1 of FIG. 4. FIG. 8 is a circuit diagram illustrating an 1-1 operation of the first charge pump CP1 of FIG. 7. FIG. 9 is a circuit diagram illustrating an 1-2 operation of the first charge pump CP1 of FIG. 7.

Referring to FIGS. 1 to 9, the first charge pump CPI includes an 1-1 switch SW11 including a first electrode receiving the power voltage VDD and a second electrode connected to an 1-2 node N12, an 1-2 switch SW12 including a first electrode connected to an 1-1 node N11 and a second electrode connected to the ground, an 1-3 switch SW13 including a first electrode receiving the power voltage VDD and a second electrode connected to the 1-1 node N11 and an 1-4 switch SW14 including a first electrode connected to the 1-2 node N12 and a second electrode connected to an 1-3 node N13.

The first charge pump CP1 further includes an 1-1 capacitor C11 including a first electrode connected to the 1-1 node N11 and a second electrode connected to the 1-2 node N12.

The first charge pump CP1 further includes an 1-2 capacitor C12 including a first electrode connected to the 1-3 node N13 and a second electrode connected to the ground.

In the 1-1 operation, the 1-1 switch S11 and the 1-2 switch S12 are turned on and the 1-3 switch S13 and the 1-4 switch S14 are turned off. In the 1-1 operation, the power voltage VDD is charged to the 1-1 capacitor C11 by the 1-1 switch S11 and the 1-2 switch S12 which are turned on.

In the 1-2 operation, the 1-3 switch S13 and the 1-4 switch S14 are turned on and the 1-1 switch S11 and the 1-2 switch S12 are turned off. In the 1-2 operation, the first voltage V1 is outputted to an output terminal by the 1-3 switch S13 and the 1-4 switch S14 which are turned on.

In the 1-1 operation, the power voltage VDD is charged to the 1-1 capacitor C11. In the 1-2 operation, the power voltage VDD applied to the first electrode of the 1-3 switch S13 is added to the power voltage VDD charged at the 1-1 capacitor C11 so that a sum of the power voltage VDD applied to the first electrode of the 1-3 switch S13 and the power voltage VDD charged at the 1-1 capacitor C11 is outputted to the output terminal of the first charge pump CP1. Thus, the first charge pump CP1 may output a voltage approximately twice the power voltage VDD as the first voltage V1.

Figure 10:
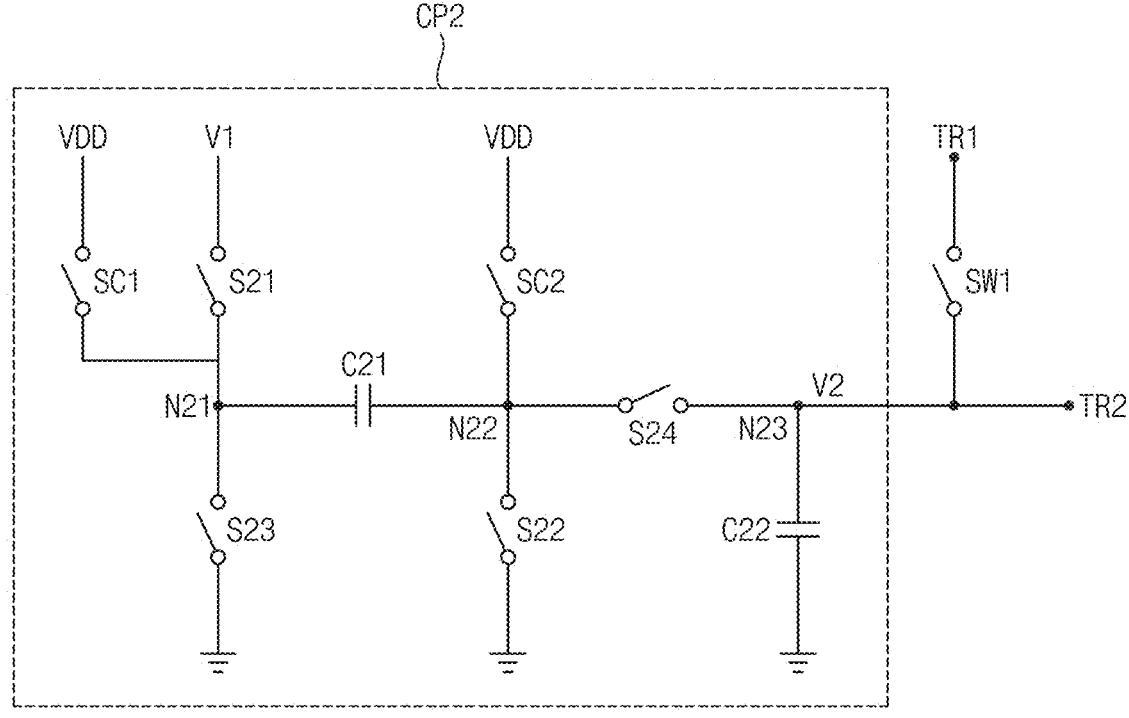
FIG. 10 is a circuit diagram illustrating a second charge pump and a path switch of FIG. 4.
Figure 11:
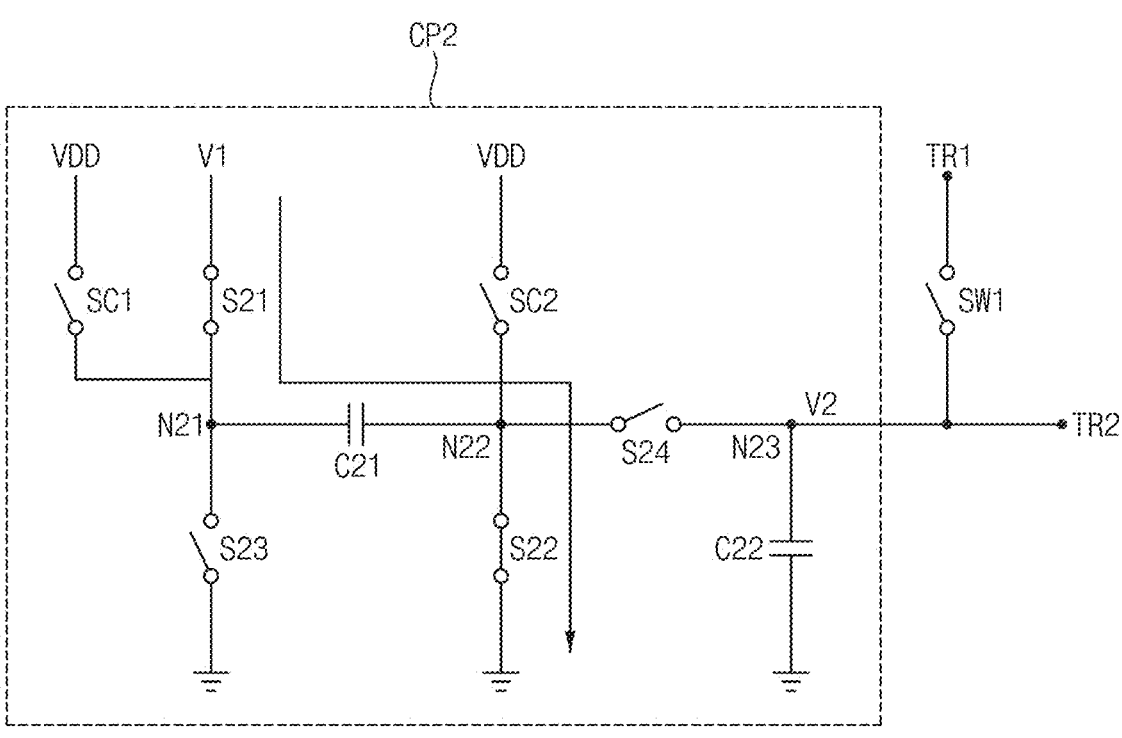
FIG. 11 is a circuit diagram illustrating a 2-1 operation of the second charge pump of FIG. 10.
Figure 12:
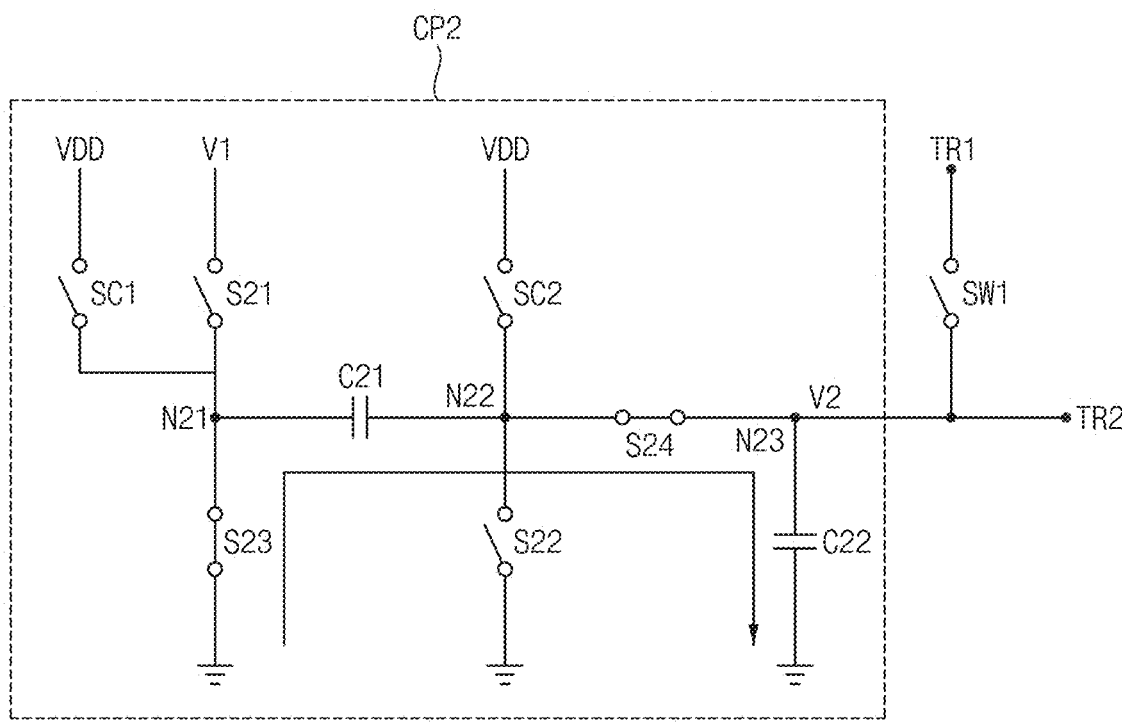
FIG. 12 is a circuit diagram illustrating a 2-2 operation of the second charge pump of FIG. 10.
Figure 13:
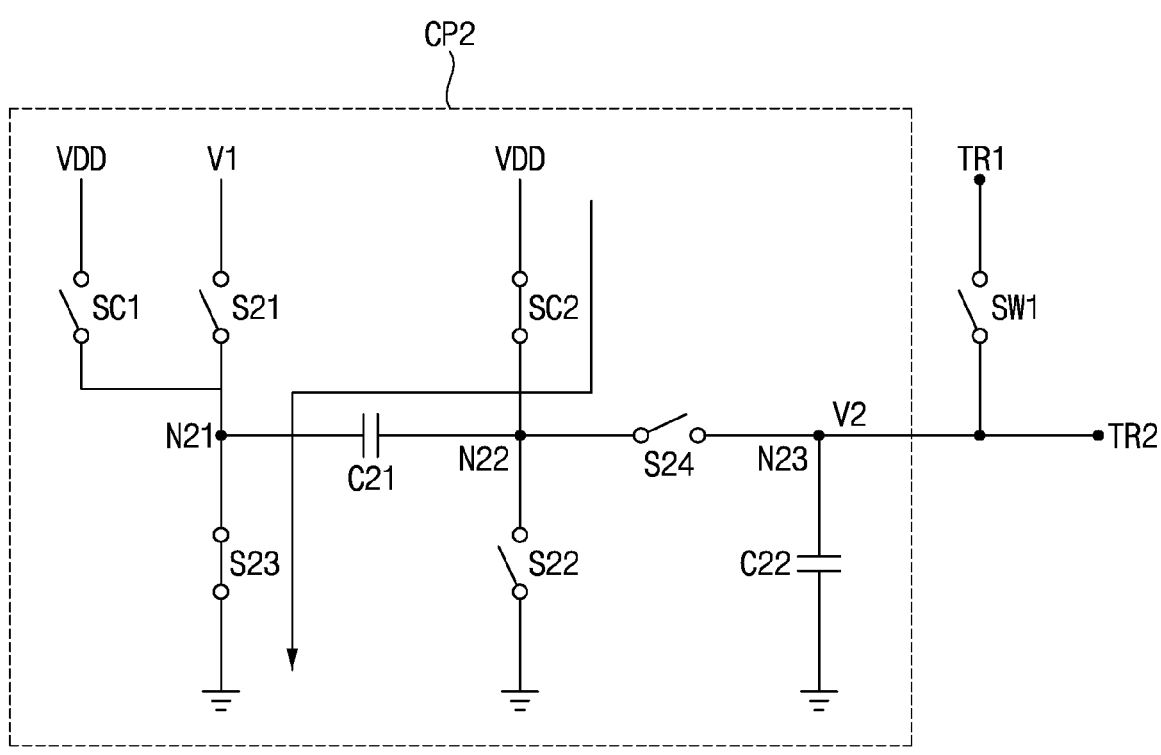
FIG. 13 is a circuit diagram illustrating a 2-3 operation of the second charge pump of FIG. 10.
Figure 14:
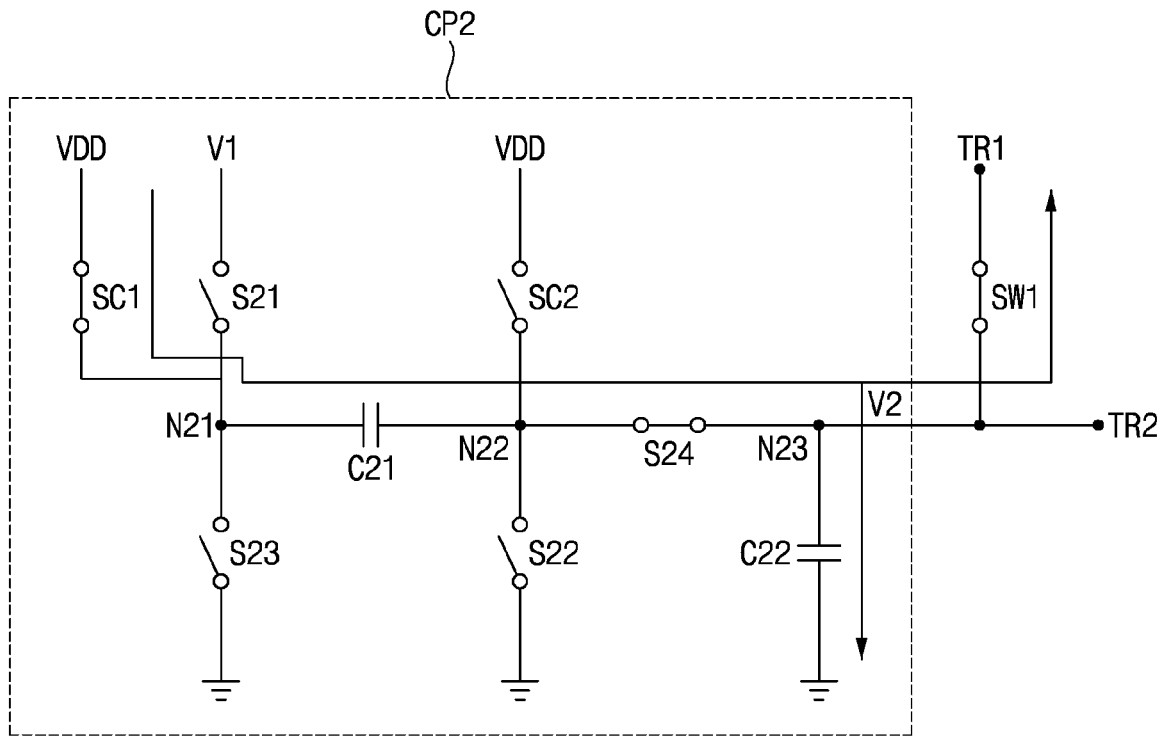
FIG. 14 is a circuit diagram illustrating a 2-4 operation of the second charge pump of FIG. 10.

FIG. 10 is a circuit diagram illustrating the second charge pump CP2 and the path switch SW1 of FIG. 4. FIG. 11 is a circuit diagram illustrating a 2-1 operation of the second charge pump of FIG. 10. FIG. 12 is a circuit diagram illustrating a 2-2 operation of the second charge pump of FIG. 10. FIG. 13 is a circuit diagram illustrating a 2-3 operation of the second charge pump of FIG. 10. FIG. 14 is a circuit diagram illustrating a 2-4 operation of the second charge pump of FIG. 10.

Referring to FIGS. 1 to 14, the second charge pump CP2 includes a 2-1 switch S21, a 2-2 switch S22, a 2-3 switch S23, a 2-4 switch S24, a 2-1 capacitor C21, a 2-2 capacitor C22, a first converting switch SC1 and a second converting switch SC2.

The 2-1 switch S21 includes a first electrode receiving the first voltage V1 and a second electrode connected to a 2-1 node N21. The 2-2 switch S22 includes a first electrode connected to the 2-2 node N22 and a second electrode connected to the ground. The 2-3 switch S23 includes a first electrode connected to the 2-1 node N21 and a second electrode connected to the ground. The 2-4 switch S24 includes a first electrode connected to the 2-2 node N22 and a second electrode connected to a 2-3 node N23.

The 2-1 capacitor C21 includes a first electrode connected to the 2-1 node N21 and a second electrode connected to the 2-2 node N22. The 2-2 capacitor C22 includes a first electrode connected to the 2-3 node N23 and a second electrode connected to the ground.

The first converting switch SC1 includes a first electrode receiving the power voltage VDD and a second electrode connected to the 2-1 node N21. The second converting switch SC2 includes a first electrode receiving the power voltage VDD and a second electrode connected to the 2-2 node N22.

In the first mode (the positive-negative mode), the second charge pump CP2 operates the 2-1 operation and the 2-2 operation. In the first mode, the second charge pump CP2 may operate an operation of a negative charge pump.

In the 2-1 operation, the 2-1 switch S21 and the 2-2 switch S22 are turned on and the 2-3 switch S23, the 2-4 switch S24, the first converting switch SC1 and the second converting switch SC2 are turned off. In addition, in the 2-1 operation, the path switch SW1 is turned off. In the 2-1 operation, the first voltage V1 is charged to the 2-1 capacitor C21 by the 2-1 switch S21 and the 2-2 switch S22 which are turned on.

In the 2-2 operation, the 2-3 switch S23 and the 2-4 switch S24 are turned on and the 2-1 switch S21, the 2-2 switch S22, the first converting switch SC1 and the second converting switch SC2 are turned off. In addition, in the 2-2 operation, the path switch SW1 is turned off. In the 2-2 operation, the second voltage V2 is outputted to the output terminal by the 2-3 switch S23 and the 2-4 switch S24 which are turned on.

In the 2-1 operation, the first voltage V1 is charged to the 2-1 capacitor C21. In the 2-2 operation, a polarity of the first voltage V1 charged at the 2-1 capacitor C21 is inverted and output to the output terminal of the second charge pump CP2. The second charge pump CP2 may output a voltage that is −1 times the first voltage V1 as the second voltage V2.

In the 2-2 operation, the path switch SW1 is turned off and the second voltage V2 which is the output of the second charge pump CP2 is applied to the second input terminal TR2 of the signal generator SG.

In the first mode (the positive-negative mode), the first voltage V1 which is the output of the first charge pump CP1 is applied to the first input terminal TR1 of the signal generator SG and the second voltage V2 which is the output of the second charge pump CP2 is applied to the second input terminal TR2 of the signal generator SG so that the signal generator SG may generate the touch driving signal TXS swinging between the first voltage V1 which is positive and the second voltage V2 which is negative.

In the second mode (the positive only mode), the second charge pump CP2 operates the 2-3 operation and the 2-4 operation. In the second mode, the second charge pump CP2 operates an operation of a positive charge pump.

In the 2-3 operation, the second converting switch SC2 and the 2-3 switch S23 are turned on and the 2-1 switch S21, the 2-2 switch S22, the 2-4 switch S24 and the first converting switch SC1 are turned off. In addition, in the 2-3 operation, the path switch SW1 is turned off. In the 2-3 operation, the power voltage VDD may be charged to the 2-1 capacitor C21 by the second converting switch SW2 and the 2-3 switch S23 which are turned on.

In the 2-4 operation, the first converting switch SC1 and the 2-4 switch S24 are turned on and the 2-1 switch S21, the 2-2 switch S22, the 2-3 switch S23 and the second converting switch SC2 are turned off. In addition, the 2-4 operation, the path switch SW1 is turned on. In the 2-4 operation, the second voltage V2 may be outputted to the output terminal by the first converting switch SC1 and the 2-4 switch S24 which are turned on.

In the 2-3 operation, the power voltage VDD is charged to the 2-1 capacitor C21. In the 2-4 operation, the power voltage VDD applied to the first electrode of the first converting switch SC1 is added to the power voltage VDD charged at the 2-1 capacitor C21 so that a sum of the power voltage VDD applied to the first electrode of the first converting switch SC1 and the power voltage VDD charged at the 2-1 capacitor C21 is outputted to the output terminal of the second charge pump CP2. Thus, the second charge pump CP2 may output a voltage approximately twice the power voltage VDD as the second voltage V2.

In the 2-4 operation, the path switch SW1 is turned on so that the second voltage V2 which is the output of the second charge pump CP2 may be applied to the first input terminal TR1 of the signal generator SG.

In the second mode (the positive only mode), the first voltage V1 which is the output of the first charge pump CP1 and the second voltage V2 which is the output of the second charge pump CP2 may be commonly applied to the first input terminal TR1 of the signal generator SG so that the signal generator SG may generate the touch driving signal TXS swinging between the first voltage V1 which is positive and a ground voltage.

Figure 15:
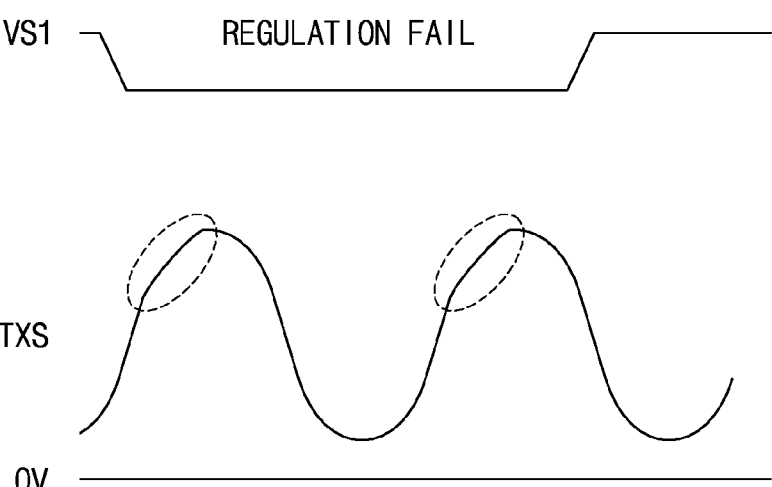
FIG. 15 is a waveform diagram illustrating an input voltage of a signal generator and a touch driving signal according to a comparative embodiment in a heavy load positive swing.

FIG. 15 is a waveform diagram illustrating an input voltage VS1 of a signal generator and a touch driving signal TXS according to a comparative embodiment in a heavy load positive swing.

A touch driver according to a comparative embodiment includes one positive charge pump and one negative charge pump. Herein, the input voltage VS1 of the signal generator may be a voltage applied to a first input terminal of the signal generator.

Referring to FIG. 15, when only a positive voltage swing is needed in a heavy load condition due to an increase of a size of the touch panel, a regulation of an output voltage may fail due to insufficient capacity of the positive charge pump.

The signal generator generates a sine wave signal based on the output voltage of the positive charge pump so that distortion of the sine wave signal may occur when the regulation of the output voltage fails. The distortion of the sine wave signal may generate unwanted harmonic components and the unwanted harmonic components may worsen an electromagnetic interference (EMI).

Figure 16:
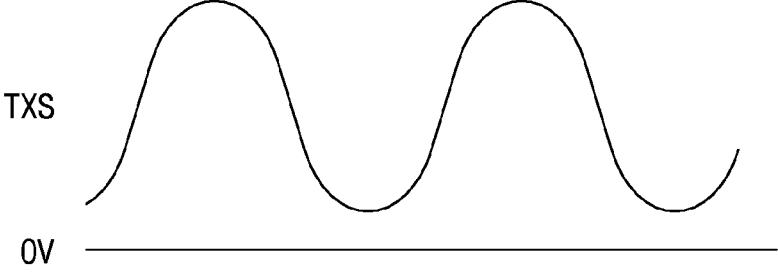
FIG. 16 is a waveform diagram illustrating an input voltage of a signal generator and a touch driving signal according to a present embodiment in a heavy load positive swing.

FIG. 16 is a waveform diagram illustrating an input voltage VS1 of the signal generator SG and a touch driving signal TXS according to a present embodiment in a heavy load positive swing.

Referring to FIGS. 1 to 14 and 16, the touch driver 400 include one positive charge pump CP1 and one positive and negative switchable charge pump CP2. Herein, the input voltage VS1 of the signal generator SG may be a voltage applied to the first input terminal TR1 of the signal generator SG.

When only a positive voltage swing is needed in a heavy load condition due to an increase of a size of the touch panel, the second charge pump CP2 which is the positive and negative switchable charge pump CP2 may operate as a positive charge pump.

In other words, when only a positive voltage swing is needed in a heavy load condition due to an increase of a size of the touch panel, the first charge pump CP1 and the second charge pump CP2 operates as dual charge pumps outputting substantially the same positive voltage.

As such, when both of the first charge pump CP1 and the second charge pump CP2 operate as the positive charge pump, the capacity of the positive charge pumps CP1 and CP2 increases so that the regulation fail of the output voltage may be prevented. Thus, the distortion of the sine wave signal due to the regulation fail of the output voltage may be prevented and the EMI may be enhanced.

In addition, a current flowing through a single charge pump may be reduced so that a loss in the charge pump may be reduced and the efficiency of the positive charge pump CP1 and CP2 may be increased.

According to the present embodiment, when the positive swing of a heavy load is needed, the second charge pump CP2 may be converted from the negative charge pump to the positive charge pump so that the charge pump may handle the heavy load. For example, the second charge pump CP2 may be switched from operating as a negative charge pump to operating as a positive charge pump. Accordingly, the reliability of the touch driver 400 may be enhanced.

In addition, the second charge pump CP2 may be converted from the negative charge pump to the positive charge pump so that the distortion of the sine wave due to insufficient capacity of the first charge pump CP1 may be prevented and the deterioration of the EMI due to the distortion may be prevented. Thus, the EMI of the display apparatus may be reduced.

In addition, the second charge pump CP2 may be converted from the negative charge pump to the positive charge pump so that the current flowing through the first charge pump CP1 may be reduced and accordingly, the power consumption of the touch driver 400 may be reduced.

Figure 17:
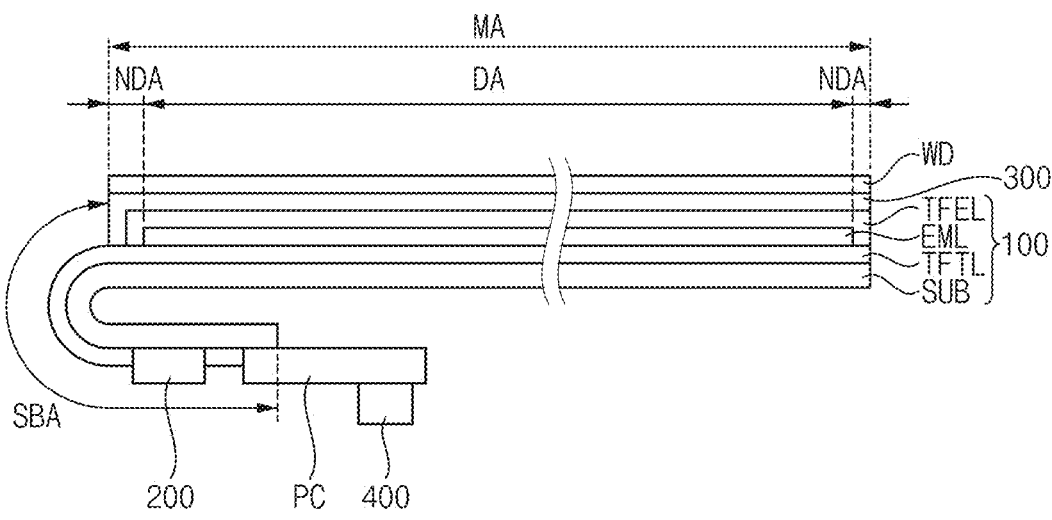
FIG. 17 is a cross-sectional view illustrating an example of a display apparatus of FIG. 1.

FIG. 17 is a cross-sectional view illustrating an example of a display apparatus of FIG. 1.

Referring to FIGS. 1 to 14, 16 and 17, the display apparatus includes the display panel 100, the display panel driver 200, the touch panel 300, a display circuit board PC and the touch driver 400.

The display panel 100 includes a main area MA and a sub area SBA. The main area MA may include a display area DA and a non-display area NDA which is a peripheral region of the display area DA.

The display area DA may include the pixels P for displaying an image. The sub area SBA protrude from a side of the main area MA.

For example, the sub area SBA may be bended as shown in FIG. 17. When the sub area SBA is bended as shown in FIG. 17, the sub area SBA may be disposed under the main area MA. When the sub area SBA is bended, the sub area SBA may be overlapped with the main area MA in a thickness direction of a substrate SUB. The display panel driver 200 may be disposed in the sub area SBA.

In an embodiment, the display panel 100 includes the substrate SUB, a thin film transistor layer TFTL, a light emitting element layer EML and an encapsulation layer TFEL. The touch panel 300 may be disposed on a front surface of the display panel 100.

The thin film transistor layer TFTL may be disposed on the substrate SUB. The thin film transistor layer TFTL may be disposed in the main area MA and the sub area SBA. The thin film transistor layer TFTL may include thin film transistors.

The light emitting element layer EML may be disposed on the thin film transistor layer TFTL. The light emitting element layer EML may be disposed in the display area DA of the main area MA. The light emitting element layer EML may include light emitting elements disposed on light emitting portions.

The encapsulation layer TFEL may be disposed on the light emitting element layer EML. The encapsulation layer TFEL may be disposed on the display area DA and the non-display area NDA of the main area MA. The encapsulation layer TFEL may include at least one inorganic layer and at least one organic layer to encapsulate the light emitting element layer EML.

The touch panel 300 may be formed on the encapsulation layer TFEL or mounted on the encapsulation layer TFEL. The touch panel 300 may be disposed on the display area DA of the main area MA. The touch panel 300 may sense a touch of a human body (e.g., a finger) or an object (e.g., a pen or stylus) using touch electrodes.

A window WD may be disposed on the touch panel 300. The window WD may be attached to the touch panel 300 by a transparent adhesive element such as an optically clear adhesive (OCA) film or an optically clear resin (OCR). The window WD may be an inorganic material such as glass, or an organic material such as plastic or polymer material. To prevent image visibility from being reduced due to reflection of external light, a polarizing film may be additionally disposed between the touch panel 300 and the window WD.

The display panel driver 200 may generate signals and voltages for driving the display panel 100. A portion of the display panel driver 200 may be formed of an integrated circuit IC and may be attached to the display panel 100 using a chip on glass (COG) method, a chip on plastic (COP) method or an ultrasonic bonding method. However, the present inventive concept is not limited thereto. For example, a portion of the display panel driver 200 may be attached to the display circuit board PC in a chip on film (COF) method.

The display circuit board PC may be attached to an end portion of the sub area SBA. Accordingly, the display circuit board PC may be electrically connected to the display panel 100 and the display panel driver 200. The display circuit board PC may be a flexible printed circuit board, a printed circuit board or a flexible film such as a chip on film.

The touch driver 400 may be disposed on the display circuit board PC. The touch driver 400 may be formed as an integrated circuit IC and attached to the display circuit board PC.

For example, the touch driver 400 may be connected to the touch electrodes of the touch panel 300. The touch driver 400 may apply the touch driving signals TXS to the touch electrodes and may measure a change in charge of mutual capacitance of each of a plurality of touch nodes formed by the touch electrodes.

For example, the touch driver 400 may measure a change in capacitance of a plurality of touch nodes according to a change in a voltage magnitude or a current amount of the touch sensing signal RXS received through the touch electrodes. In this way, the touch driver 400 may determine a user's touch or a user's proximity according to an amount of the change in the mutual capacitance of each of the plurality of touch nodes. The user's touch may mean that an object, such as a user's finger or a pen, directly contacts a surface of the window WD disposed on the touch panel 300. The user's proximity may mean that an object, such as the user's finger or the pen, is hovering over or approaching the surface of the window WD.

The touch driver 400 may extract touch coordinates or may switch driving modes by correcting the touch sensing signals RXS according to a noise level according to a low temperature driving, a charging mode, a high frequency application, an electromagnetic noise application status, etc.

For example, when the touch driver 400 determines the noise level, the touch driver 400 may perform a correction such as rejecting the touch sensing signals RXS depending on whether a body part or an object is detected through human body detection sensors of the display panel 100. In addition, the touch driver 400 may sense the user's touch by selectively changing a touch area of interest depending on whether a body part located in a front direction of the display panel 100 is detected, and may change the driving mode to a low power mode or a standby mode, etc.

Figure 18:
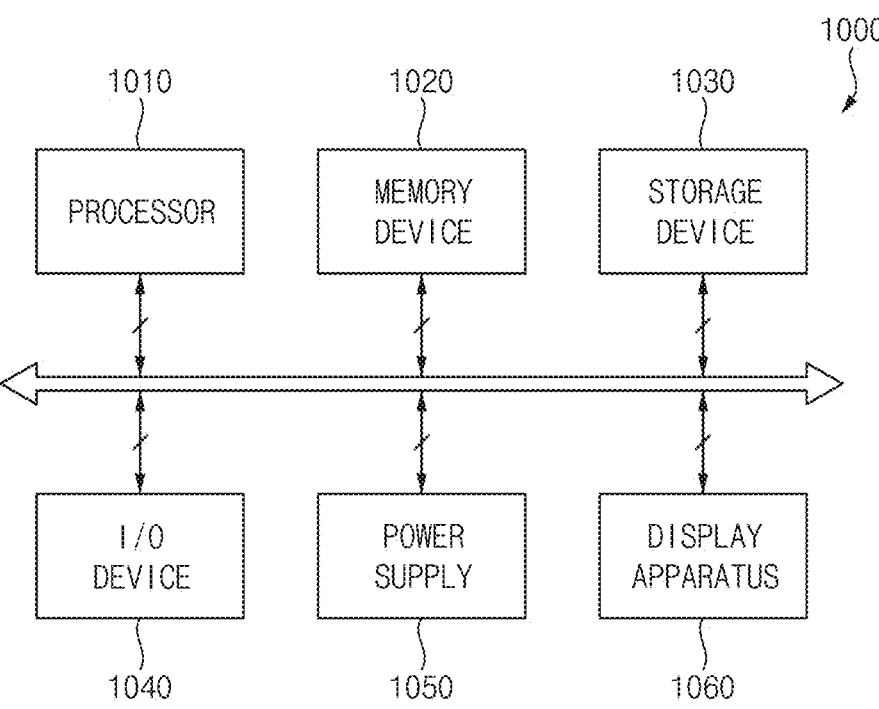
FIG. 18 is a block diagram illustrating an electronic apparatus according to an embodiment of the present inventive concept.
Figure 19:
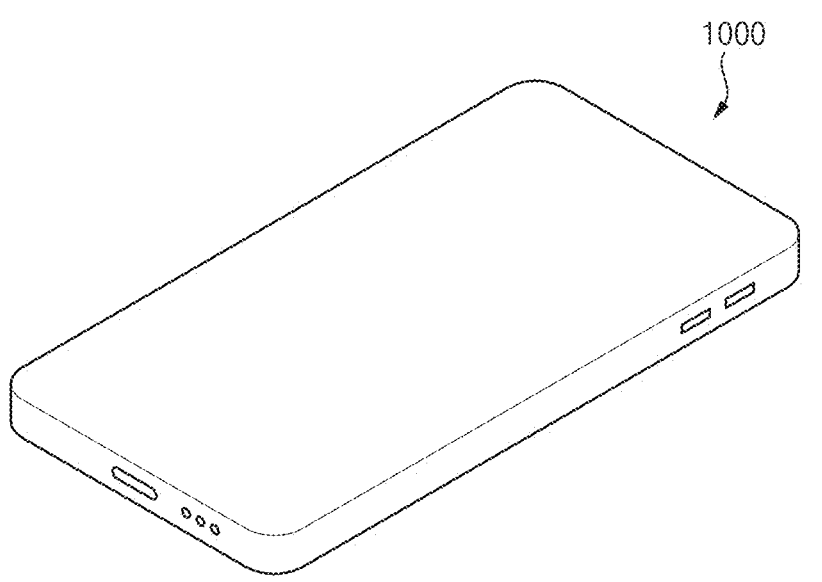
FIG. 19 is a diagram illustrating an example in which the electronic apparatus of FIG. 18 is implemented as a smartphone.

FIG. 18 is a block diagram illustrating an electronic apparatus according to an embodiment of the present inventive concept. FIG. 19 is a diagram illustrating an example in which the electronic apparatus of FIG. 18 is implemented as a smartphone.

Referring to FIGS. 18 and 19, the electronic apparatus 1000 includes a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 19, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 220 of FIG. 2.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

FIG. 20 is a diagram illustrating an example in which the electronic apparatus of FIG. 18 is implemented as an automotive display.

Referring to FIGS. 18 and 20, the electronic apparatus 1000 may be implemented as the automotive display.

When the display apparatus is used for the automobiles, the EMI may affect the operation of a vehicle and cause safety problems. When the display apparatus is used for the automobiles, the safety of the vehicle may be increased by reducing the EMI.

According to the embodiments of the charge pump, the touch driver including the charge pump and the display apparatus including the touch driver, the heavy load may be handled, the power consumption may be reduced and the EMI may be reduced.

According to an embodiment, the charge pump is capable of being converted from a negative charge pump to a positive charge pump or vice versa. The charge pump includes first and second converting switches to enable the conversion. The charge pump operates as a negative charge pump in a first mode and operates as a positive charge pump in a second mode. In the first mode, the converting switches are set such that a first voltage is applied to a first node of the charge pump and a second voltage is applied to a second node of the charge pump. In the second mode, the converting switches are set such that a power voltage and the first voltage are applied to the respective nodes. For example, in the second mode, the converting switches work in tandem to sum the power voltage with a charge stored in capacitors of the charge pump, effectively doubling the voltage to produce a positive output.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the present inventive concept. Accordingly, all such modifications are intended to be included within the scope of the present inventive concept.

What is claimed is:

1. A charge pump comprising:
a first switch including a first electrode configured to receive a first voltage and a second electrode connected to a first node;
a second switch including a first electrode connected to a second node and a second electrode connected to a ground;
a third switch including a first electrode connected to the first node and a second electrode connected to the ground;
a fourth switch including a first electrode connected to the second node and a second electrode connected to a third node;

a first capacitor including a first electrode connected to the first node and a second electrode connected to the second node;
a second capacitor including a first electrode connected to the third node and a second electrode connected to the ground;
a first converting switch including a first electrode configured to receive a power voltage and a second electrode connected to the first node; and
a second converting switch including a first electrode configured to receive the power voltage and a second electrode connected to the second node.

2. The charge pump of claim 1, wherein, in a first operation, the first switch and the second switch are turned on and the third switch, the fourth switch, the first converting switch and the second converting switch are turned off.

3. The charge pump of claim 2, wherein, in a second operation, the third switch and the fourth switch are turned on and the first switch, the second switch, the first converting switch and the second converting switch are turned off.

4. The charge pump of claim 1, wherein, in a third operation, the second converting switch and the third switch are turned on and the first switch, the second switch, the fourth switch and the first converting switch are turned off.

5. The charge pump of claim 4, wherein, in a fourth operation, the first converting switch and the fourth switch are turned on and the first switch, the second switch, the third switch and the second converting switch are turned off.

6. A touch driver comprising:
a first charge pump configured to receive a power voltage to output a first voltage;
a second charge pump configured to receive the power voltage and the first voltage to output a second voltage;
a path switch including a first electrode connected to an output terminal of the first charge pump and a second electrode connected to an output terminal of the second charge pump; and
a signal generator including a first input terminal connected to the output terminal of the first charge pump and a second input terminal connected to the output terminal of the second charge pump.

7. The touch driver of claim 6, wherein, in a first mode, the path switch is turned off, the first voltage is applied to the first input terminal of the signal generator and the second voltage is applied to the second input terminal of the signal generator.

8. The touch driver of claim 6, wherein, in a second mode, the path switch is turned on, the first voltage is applied to the first input terminal of the signal generator and the second voltage is applied to the first input terminal of the signal generator.

9. The touch driver of claim 6, wherein the second charge pump comprises:
a first switch including a first electrode configured to receive the first voltage and a second electrode connected to a first node;
a second switch including a first electrode connected to a second node and a second electrode connected to a ground;
a third switch including a first electrode connected to the first node and a second electrode connected to the ground;
a fourth switch including a first electrode connected to the second node and a second electrode connected to a third node;

a first capacitor including a first electrode connected to the first node and a second electrode connected to the second node;

a second capacitor including a first electrode connected to the third node and a second electrode connected to the ground;

a first converting switch including a first electrode configured to receive the power voltage and a second electrode connected to the first node; and a second converting switch including a first electrode configured to receive the power voltage and a second electrode connected to the second node.

10. The touch driver of claim 9, wherein, in a first operation, the first switch and the second switch are turned on, the third switch, the fourth switch, the first converting switch and the second converting switch are turned off and the path switch is turned off.

11. The touch driver of claim 10, wherein, in a second operation, the third switch and the fourth switch are turned on, the first switch, the second switch, the first converting switch and the second converting switch are turned off and the path switch is turned off.

12. The touch driver of claim 9, wherein, in a third operation, the second converting switch and the third switch are turned on, the first switch, the second switch, the fourth switch and the first converting switch are turned off and the path switch is turned off.

13. The touch driver of claim 12, wherein, in a fourth operation, the first converting switch and the fourth switch are turned on, the first switch, the second switch, the third switch and the second converting switch are turned off and the path switch is turned on.

14. The touch driver of claim 6, wherein the first charge pump comprises:

a first switch including a first electrode configured to receive the power voltage and a second electrode connected to a second node;

a second switch including a first electrode connected to a first node and a second electrode connected to a ground;

a third switch including a first electrode configured to receive the power voltage and a second electrode connected to the first node;

a fourth switch including a first electrode connected to the second node and a second electrode connected to a third node;

a first capacitor including a first electrode connected to the first node and a second electrode connected to the second node; and a second capacitor including a first electrode connected to the third node and a second electrode connected to the ground.

15. The touch driver of claim 14, wherein, in a first operation, the first switch and the second switch are turned on and the third switch and the fourth switch are turned off.

16. The touch driver of claim 15, wherein, in a second operation, the third switch and the fourth switch are turned on and the first switch and the second switch are turned off.

17. The touch driver of claim 6, further comprising a multiplexer connected to the signal generator, wherein the multiplexer is connected to a transmitting electrode of a touch panel.

18. A display apparatus comprising:

a display panel;

a display panel driver configured to drive the display panel;

a touch panel; and a touch driver configured to drive the touch panel, wherein the touch driver comprises:

a first charge pump configured to receive a power voltage to output a first voltage;

a second charge pump configured to receive the power voltage and the first voltage to output a second voltage;

a path switch including a first electrode connected to an output terminal of the first charge pump and a second electrode connected to an output terminal of the second charge pump; and a signal generator including a first input terminal connected to the output terminal of the first charge pump and a second input terminal connected to the output terminal of the second charge pump.

19. The display apparatus of claim 18, wherein the second charge pump comprises:

a first switch including a first electrode configured to receive the first voltage and a second electrode connected to a first node;

a second switch including a first electrode connected to a second node and a second electrode connected to a ground;

a third switch including a first electrode connected to the first node and a second electrode connected to the ground;

a fourth switch including a first electrode connected to the second node and a second electrode connected to a third node;

a first capacitor including a first electrode connected to the first node and a second electrode connected to the second node;

a second capacitor including a first electrode connected to the third node and a second electrode connected to the ground;

a first converting switch including a first electrode configured to receive the power voltage and a second electrode connected to the first node; and a second converting switch including a first electrode configured to receive the power voltage and a second electrode connected to the second node.

20. The display apparatus of claim 18, wherein the first charge pump comprises:

a first switch including a first electrode configured to receive the power voltage and a second electrode connected to a second node;

a second switch including a first electrode connected to a first node and a second electrode connected to a ground;

a third switch including a first electrode configured to receive the power voltage and a second electrode connected to the first node;

a fourth switch including a first electrode connected to the second node and a second electrode connected to a third node;

a first capacitor including a first electrode connected to the first node and a second electrode connected to the second node; and a second capacitor including a first electrode connected to the third node and a second electrode connected to the ground.

* * * * *